United States Patent [19]

Ravier et al.

[11] 4,010,091
[45] Mar. 1, 1977

[54] NOVEL ELECTRODE FOR ELECTROLYSIS CELL

[75] Inventors: Dominique Ravier, Paris; Pierre Bouy, Enghien-les-Bains, both of France

[73] Assignee: Rhone-Poulenc Industries, Paris, France

[22] Filed: May 12, 1976

[21] Appl. No.: 685,691

[30] Foreign Application Priority Data

May 30, 1975 France .................... 75.16966

[52] U.S. Cl. .................. 204/290 F; 204/290 R; 204/291

[51] Int. Cl.² ................ C25B 11/08; C25B 11/10

[58] Field of Search .......... 204/290 R, 290 F, 291; 252/521, 519

[56] References Cited

UNITED STATES PATENTS

| | | | |
|---|---|---|---|
| 3,801,490 | 4/1974 | Welch | 204/290 F |
| 3,804,740 | 4/1974 | Welch | 204/290 R |
| 3,917,525 | 11/1975 | Bouy et al. | 204/290 F |
| 3,974,108 | 8/1976 | Staut et al. | 252/521 |

FOREIGN PATENTS OR APPLICATIONS 7,204,743   6/1973   Netherlands

*Primary Examiner*—F.C. Edmundson

[57] ABSTRACT

A novel electrode for an electrolytic cell is provided which electrode is characterized in that it comprises at least one compound of perovskite structure, of the general formula:

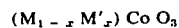

$(M_{1-x} M'_x) Co O_3$ wherein M is an ion of a metal from the group comprising yttrium and lanthanides, M' is an ion of a metal chosen from the group comprising ruthenium, rhenium, osmium, iridium, platinum, lead and palladium, and $x$ is less than 1. The electrode is particularly suitable as an anode during electrolysis of alkali-metal halides.

10 Claims, No Drawings

NOVEL ELECTRODE FOR ELECTROLYSIS CELL

BACKGROUND OF THE INVENTION

The invention relates to a new electrode comprising a compound of perovskite structure. An electrode of this type may be used particularly in cells for electrolysis of alkali-metal halides or alkali-metal chlorates and perchlorates.

The use of a metal of the platinum series electrode employed in electrolysis has been known for a long time. Platinum and platinum alloys are known to have considerable advantages due to their long life, particularly in electrolysis of alkali-metal halide solutions, especially sodium chloride solutions. However, such anodes made of solid metals from the platinum series are prohibitive in price, with the result that graphite anodes have generally been used until quite recently. Unfortunately, graphite anodes wear away rapidly in use. On the one hand, this means that they have to be replaced frequently, and on the other hand, it means that conditions encountered in electrolysis vary to the extent that wear on the anodes changes the interpolar distance. This defect is all the more serious in that, for economic reasons and particularly reasons of industrial production, it is desirable to increase current densities and reduce interpolar distances.

For this reason, attempts have been made to make anodes with dimensions which do not vary substantially during operation. The first arrangement used for this purpose was a conductive substrate which was chemically inert in the electrolytic medium and covered with an active layer. The material used for the substrate was generally a valve metal capable of forming a blocking layer of oxide in electrolytic solutions, and to protect its surface from corrosion in places where the metal of the active layer is porous. In particular, an anode was used, made of a substrate of titanium covered with an active layer consisting of a metal from the platinum series. Unfortunately, the titanium oxide which forms to protect the titanium substrate chemically is itself non-conductive. Thus, French Pat. No. 2,088,659 proposed making the blocking layer of a precious metal on a carrier which was a good conductor of electricity. However, such a solution has the disadvantage of being economically expensive. Attempts have also been made to replace the active layer of noble metal or compounds of noble metal with other products, e.g., oxides of noble metals.

It has also been proposed, e.g., in French Pat. No. 2,128,667, that an anode comprising a substrate, e.g., of titanium should be covered with a thin film of an electrically conductive coating such as a metal of the platinum group or an oxide or sulphide of such a metal, with an external layer of a compound of perovskite structure applied to it. Unfortunately, such perovskite structures are generally soluble in an acid medium and non-conductive. In electrolysis of sodium chloride, slight oxidation of the water at the surface of the electrodes leads to the formation of a diffusion layer which is even more acid than the medium, which makes the above disadvantage even more serious. It has, indeed, been proposed to increase the activity of such a structure by doping it, e.g., with strontium or nickel in the case of lanthanum cobaltite. Unfortunately, the solubility of the compound of perovskite structure is further increased.

Moreover, in the cases where a valve metal such as titanium is used as the substrate, there is reason to prevent the substrate from being passivated by the growth of a layer of non-conductive titanium dioxide. Thus, in Bouy et al. U.S. application, Ser. No. 486,052, filed July 5, 1974, commonly owned, there is disclosed a method for the deposition of a layer of perovskite compound directly on the substrate, using a solution of a cobalt salt which gives a cobalt oxide by thermolysis. The appropriate compound of perovskite structure is of the general formula $A^a B^b O_3$, wherein A represents a metal ion and B is another metal ion, A and B being linked by the equation $a + b = 6$, wherein $a$ and $b$ respectively represent the classical valencies or ionic charges of ions A and B. An account of the structure of this type of compound is given, e.g., in "Crystal Structure" by Wyckoff, Vol. 2, 2nd edition (1964), Wiley and Sons, pages 390 to 402.

It has been noted in particular that compounds of the formula $Ln CoO_3$, in which Ln is a metal of the lanthanum family, behave well in slightly acid environment which enables them to be used as anodes in certain electrolytic media. But it has been observed that corrosion in an acid medium decreases, the more acid the character of the rare earth metal used.

This led Bouy and Cheradame to propose a cobaltite of rare earths in their U.S. Pat. No. 3,917,525, granted Nov. 4, 1975. The cobaltite comprised at least two rare earths, one of the rare earths having a high atomic number and not giving a compound of solely perovskite structure when combined with cobalt. But although all these compounds give interesting results, the durability obtained is still somewhat less than desired considering the requirements for modern electrolytic cells. Moreover, it has been noted that if the thickness of the layer is increased to obtain greater durability, the tension of the electrode is increased simultaneously, thus making this solution difficult to apply industrially.

It is, accordingly, an object of the present invention to provide electrodes for electrolytic cells which do not have the shortcomings of prior art electrodes.

It is also an object of the present invention to provide an electrode for an electrolytic cell which employs a cobaltite of perovskite structure, which electrode possesses excellent durability.

It is a further object of the present invention to provide electrodes for electrolytic cells, which electrodes have excellent resistance to corrosion.

Further objects will be apparent to those skilled in the art from the present description.

GENERAL DESCRIPTION OF THE INVENTION

It has now been found in accordance with the present invention, that the disadvantages of the prior art can be lessened by making use of compounds of a perovskite structure of the general formula:

wherein, M is an ion of a metal chosen from the group comprising yttrium and lanthanides, M' is an ion of a metal chosen from the group comprising ruthenium, rhenium, osmium, iridium, platinum, lead and palladium, and $x$ is a number less than 1. As used herein, a "lanthanide" is a member of a series sometimes referred to as the "rare earth metals" and is defined, in accordance with Van Nostrand's International Encyclopedia of Chemical Science, page 669 (1964), as encompassing the elements of the Periodic Table of Elements, from lanthanum, having atomic number 57, through lutecium, having atomic number 71, inclusive, and including, therefore, additionally, cerium, praseodymium, neodymium, promethium, samarium, europium, gadolinium, terbium, dysprosium, holmium, erbium, thulium, and ytterbium.

An electrode according to the invention may either consist entirely of said compound of the general formula:

$$(M_{1-x} M'_x) Co O_3$$

or include only an active outer layer of a compound according to that formula. In the latter case, the layer may be applied to a conductive substrate, such as titanium, or other valve metal, in any known manner, e.g., by means of a metal of the platinum group or an oxide or sulphide thereof or by means of a solution containing cobalt nitrate.

The compounds employed in the invention advantageously have a structure which is a distortion of the original structure, the metal M' being included in the compound as a substitution agent in a relatively low proportion, $x$ preferably being from about 0.01 to 0.2. It has been found that particularly desirable results can be obtained when gadolinium or terbium is used as the rare earth metal or lanthanide, M, and ruthenium or lead as metal M'.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

8.62 (grams) of $Gd_2O_3$ (99.9%); 0.828 g. of Pb $(NO_3)_2$ and 4.15 g. of cobalt oxide containing 71% of Co are weighed out, then intimately mixed during crushing. The powder obtained is then compressed under 2 tons/cm.$^2$ into pastille form. The pastilles are then baked in air for 15 hours at 1150° C. The crushing and pastille-forming operations are repeated twice along with repetition of the heat treatments to obtain a homogeneous product and completed reactions. The product obtained is then characterized by its X-ray spectrum and is of the formula $(Gd_{0.95} Pb_{0.05}) Co O_3$.

The product thus prepared is deposited on a titanium surface which has previously been cleaned by sanding, washed with distilled water and dried. A suspension of the compound obtained is formed as follows: to 1 g. of powder (particle size from 10 to 40 microns) there is added 1 g. of hydrated cobalt nitrate containing 6 molecules of water, 1 ml. of water and 1 ml. of isopropyl alcohol. The paste obtained is vigorously agitated until a homogeneous suspension is obtained and agitation is maintained during the formation of the deposit. A layer of the cobaltite suspension is applied with a brush. After drying for 5 minutes in an oven at 100° C., the electrode is kept for 10 minutes in a furnace at 400° C. with air blowing over it. The operation is repeated thus 20 times. The quantity of product deposited is approximately 40 mg./cm.$^2$. The deposit contains about 20% of cobalt oxide.

The electrode thus prepared is placed in an electrolytic cell for the production of chlorine and soda. The electrolyte in it is an aqueous solution containing 300 g./liter of sodium chloride, which is kept at 80° C. and has a pH level of 4.

The anode obtained with the product $(Gd_{0.95} Pb_{0.05}) Co O_3$, deposited as described above and working at 50 amperes per square decimeter, has a tension of 1200 millivolts ECS (against a saturated calomel electrode) after 1600 hours of operation.

EXAMPLE 2

A compound of the formula $(Gd_{0.95} Ru_{0.05}) Co O_3$ is prepared following the same procedure as in Example 1. For this purpose 8.62 g. of $Gd_2O_3$ (99.9%); 0.665 g. of $RuCl_3$, $x H_2O$ containing 38% of Ru; and 4.15 g. of cobalt oxide containing 71% of Co are weighed out.

The compound of the formula $(Gd_{0.95} Ru_{0.05}) Co O_3$ is deposited as in Example 1 and the anode obtained, working at 50 amperes per square decimeter, has a tension of 1150 millivolts ECS after 1400 hours' operation.

The following examples describe the preparation of other compounds according to the invention for use as anodes in electrolysis.

EXAMPLE 3

This example shows the importance of the quantity of ruthenium included in the compound of formula $(Gd_{1-x} Ru_x) Co O_3$.

A compound of formula $(Gd_{0.85} Ru_{0.15}) Co O_3$ is first prepared in the same way as in the previous examples, by weighing out 7.71 g. of $Gd_2O_3$ (99.9%); 2.00 g. of $RuCl_3$, $x H_2O$ containing 38% of Ru; and 4.15 g. of cobalt oxide containing 71% of Co.

An anode made of titanium and coated with this compound, operating at a current density of 25 amperes per square decimeter, and obtained as in Example 1, has a tension of 1300 millivolts ECS after 1200 hours' operation.

A compound of formula $Gd_{0.75} Ru_{0.25} Co O_3$ is then prepared by weighing out 6.800 g. of $Gd_2O_3$ (99.9%); 3.345 g. of $Ru Cl_3$, $x H_2O$ containing 38% of Ru; and 4.15 g. of cobalt oxide containing 71% of Co.

The anode, obtained under the same conditions and still working at 25 A/dm.$^2$ (amperes per square decimeter), has the same tension of 1300 millivolts ECS after only 300 hours' operation. The result obtained is thus considerably less good.

EXAMPLE 4

This example is identical with the previous ones except that the starting materials are 8.62 g. of $Gd_2O_3$ (99.9%); 0.567 g. of $PtO_2$; and 4.15 g. of cobalt oxide containing 71% of Co.

The product obtained is of the formula $(Gd_{0.95} Pt_{0.05}) Co O_3$. An anode prepared as before and working at a current density of 25 A/dm.$^2$ has a tension of 1300 millivolts ECS after 1540 hours' operation.

EXAMPLE 5

Still following the same foregoing procedure, a compound of the formula $(Tb_{0.95} Ru_{0.05}) Co O_3$ is prepared, starting with:

8.800 g. of $Tb_4O_7$ (99.9%)
0.6775 g. of $Ru Cl_3$, $x H_2O$ containing 38% of Ru 4.150 g. of cobalt oxide containing 71% of Co.

An anode, obtained as before with this compound and operating at a current density of 25 A/dm.$^2$, has a tension of 1200 millivolts ECS after 1000 hours' operation.

These examples clearly show the importance of the electrode according to the invention. In particular, they show an unexpected increase in electrical conductivity relative to the starting compound. This makes it possible to form a relatively thick deposit and even to prepare solid anodes.

In addition, chemical resistance is unexpectedly increased in a slightly acid medium.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A novel electrode suitable for use in cells for electrolysis characterized in that it comprises at least one compound of perovskite structure of the general formula:

$$(M_{1-x} M'_x) Co O_3$$

wherein M is an ion of a metal from the group comprising yttrium and lanthanides, M' is an ion of a metal chosen from the group comprising ruthenium, rhenium, osmium, iridium, platinum, lead and palladium, and $x$ is a number less than 1.

2. An electrode according to claim 1, wherein $x$ is a number within the range from about 0.01 to 0.2.

3. An electrode according to claim 1, wherein its active layer comprises at least one compound of perovskite structure of the formula $(M_{1-x} M'_x) Co O_3$.

4. An electrode according to claim 3, wherein said electrode comprises a substrate of a valve metal and an intermediate layer comprising a metal from the platinum group or an oxide or sulphide thereof and an outer layer of said compound of perovskite structure.

5. An electrode according to claim 3, wherein said electrode comprises a substrate of a valve metal and an active layer comprising at least one compound of perovskite structure of the formula $(M_{1-x} M'_x) Co O_3$, which is deposited on the substrate by means of a solution containing cobalt nitrate.

6. An electrode according to claim 1, wherein said electrode comprises a solid material of the general formula: $(M_{1-x} M'_x) Co O_3$.

7. An electrode according to claim 1, wherein said electrode comprises at least one compound of perovskite structure of the formula: $(Gd_{1-x} Pb_x) Co O_3$.

8. An electrode according to claim 1, wherein said electrode comprises at least one compound of perovskite structure, of the formula: $(Gd_{1-x} Ru_x) Co O_3$.

9. An electrode according to claim 1, wherein said electrode comprises at least one compound of perovskite structure, of the formula: $(Gd_{1-x} Pt_x) Co O_3$.

10. An electrode according to claim 1, wherein said electrode comprises at least one compound of perovskite structure, of the formula: $(Tb_{1-x} Ru_x) Co O_3$.

* * * * *